April 4, 1967

T. W. BONNER ET AL 3,312,823
SEMICONDUCTOR RADIATION DETECTOR FOR USE
IN NUCLEAR WELL LOGGING

Filed July 7, 1961

3,312,823
SEMICONDUCTOR RADIATION DETECTOR FOR USE IN NUCLEAR WELL LOGGING
Tom W. Bonner, Houston, and William R. Mills, Jr., Dallas, Tex., assignors to Mobil Oil Corporation, a corporation of New York
Filed July 7, 1961, Ser. No. 122,485
1 Claim. (Cl. 250—83.3)

This invention relates to gamma ray detectors and has for an object the provision of a gamma ray detector of the semiconductor type which is selectively sensitive to gamma rays and which provides a high degree of resolution.

Heretofore Geiger-Muller tubes, ionization chambers, and scintillation detectors have been used for the detection of gamma rays. However, these devices leave much to be desired in their ability to distinguish between gamma radiations of different quantum energies. The more commonly used scintillation detectors have outputs which because of the phenomenon known as Compton scattering makes difficult the measurements of the quantum energies of the gamma rays to which they have been subjected.

It is an object of the present invention to provide, in a nuclear well logging system, a detector of gamma rays in which the effects of Compton scattering and response to slow and thermal neutrons have been reduced to a degree which in terms of the output is for all practical purposes negligible.

The detector is of the semiconductor type, characterized by the selection of a material of high atomic number, which includes a depletion region of large volume to assure that the output will always be not only directly proportional to the energy of the gamma ray or rays entering the detector but also will provide a high degree of resolution.

The present invention is particularly useful in measuring gamma rays characterizing certain elements of interest in nuclear well logging. For example, it is desirable to determine the presence of salt water in formations adjacent a borehole. This can be done by providing a source of neutrons in the exploration instrument which is lowered in the wellbore. The neutrons, in bombarding the salt water, are captured by the chlorine component. Chlorine when bombarded with neutrons gives off a complicated spectrum of gamma rays which cover the range of from zero up to 8.4 mev. (million electron volts. Since the gamma ray spectrum is complicated and may extend over such a wide band, the detector must provide a high degree of resolution if the presence of chlorine is to be determined, for the reason that the gamma ray spectrum from iron present in the casing of the well likewise is complicated and extends in overlapping relation with the gamma ray spectrum of the chlorine.

It is a further object of the invention to provide, for well logging use, a gamma ray detector having that degree of resolution which will permit the identification of different materials, though their gamma ray spectra may overlap.

In carrying out the invention in one form thereof, advantage is taken of the fact that the absorption effects due to the phenomenon known as photoelectric absorption varies between the fourth and fifth power of the atomic number of the material; that the phenomenon known as pair production varies by an amount approximating the second power of the atomic number, whereas the phenomenon of Compton scattering varies linearly or in direct proportion to the atomic number. Accordingly, by utilizing a detector, preferably of the semiconductor type, as for example, a diode with a p-n junction in which the principal active material in the region of the depletion zone is to a substantial extent made up of one or more elements of high atomic number, the aforesaid objects will be achieved. More particularly, the response of the detector to Compton scattering is made negligible by increasing to a high degree the response of the detector to the phenomena of photoelectric absorption and to pair production.

Further in accordance with the invention, there is minimized the likelihood in the phenomenon of pair production of loss from the detecting semiconducting mass of annihilation quanta which appear as a positron comes to rest in the detector following the introduction into the detector of a gamma ray. The foregoing is accomplished by increasing the dimensions of the detector in terms of the escape dimensions of the annihilation quanta for a given material. More particularly, the annihilation quanta generated within the mass are fully converted in the detecting mass to electrons (which participate in the development of the output signal). This is accomplished by having the detecting mass physically large, for example, in one plane both dimensions may be an inch. It is preferred that the thickness be large, as upwardly from a few millimeters. When the sensitive region is thin, the detector is preferably disposed to receive the gamma rays for travel through paths of greatest dimensions.

For further objects and advantages of the invention and for a more detailed discussion thereof including typical applications, reference is to be had to the following description taken in conjunction with the accompanying drawings, in which:

FIG. 1 schematically illustrates a gamma ray spectrometer made in accordance with the present invention;

Figure 2:
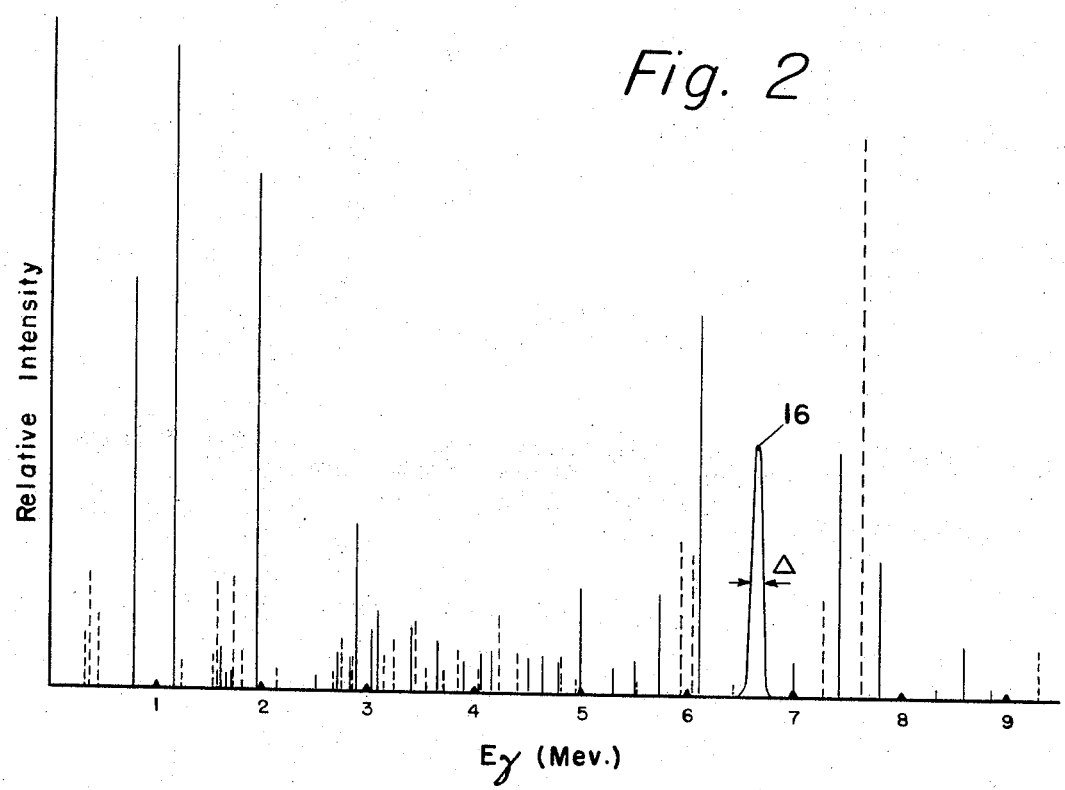
FIG. 2 is a graph of the gamma ray spectra of chlorine and iron.
Figure 3:
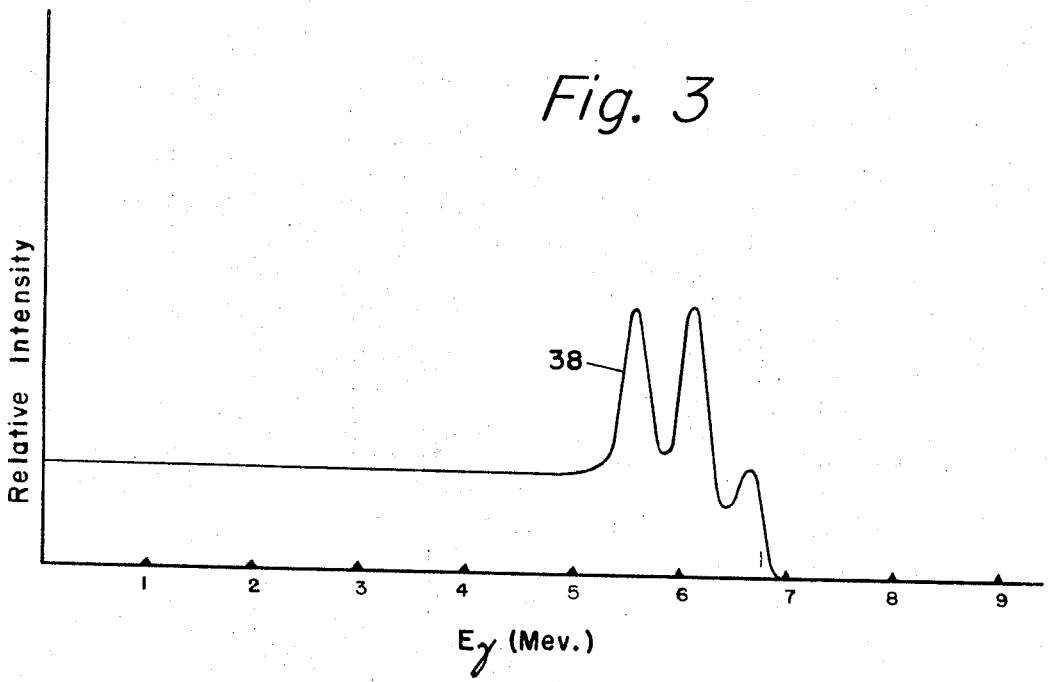
FIG. 3 is a graph indicative of the response of a scintillation gamma ray detector having a normal degree of resolution for such a device.

In FIG. 2 the solid lines represent the gamma ray spectrum of chlorine. That gamma ray spectrum is complex. Interspersed between the solid lines are a plurality of broken lines representative of the gamma ray spectrum of iron. The necessity of achieving a high resolution by a gamma ray detector can be readily understood by reason of the fact that the broken lines representing the gamma rays emanating from iron lie adjacent to similar solid lines representing the gamma rays originating from chlorine. Heretofore, gamma ray detectors have not exhibited the resolution (see FIG. 3) needed to distinguish between gamma rays emanating from iron concurrently with gamma rays emanating from chlorine. Such detectors are particularly deficient in cases where the chlorine is not concentrated and in all cases where it is desired to distinguish between materials having lines in their gamma ray spectra which are closely adjacent and in respect to which the foregoing example is but one of many which may be encountered.

Figure 1:
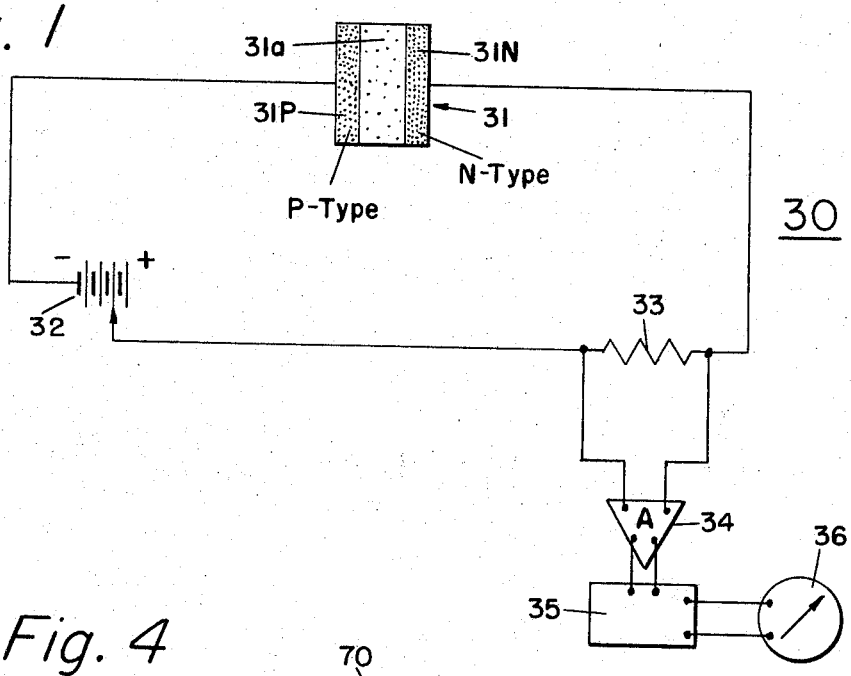

In accordance with the invention, the gamma ray spectrometer 30 of FIG. 1 includes a diode 31 having a sensitive or depletion region 31a of substantial volume and is characterized by an active material therein having a high atomic number. By utilizing an active material of high-Z (where Z represents the atomic number) the spectrometer 30 has a response which is preferential in respect to gamma rays relative to other radiant energy. By suitably selecting a high-Z active material, the neutron sensitivity will be maintained small relative to gamma ray sensitivity.

As one example of a gamma ray spectrometer in accordance with the present invention, the diode 31 will be made of bismuth telluride; the P-type of material 31P will include a slight excess of bismuth, whereas the N-type of material 31N will include a slight excess of tellurium. The slight excess of bismuth in the region of the material 31P gives rise to a deficiency or shortage of electrons or an excess of holes, whereas the slight excess of tellurium in the material 31N gives rise to an excess of electrons. The diode 31 is reverse-biased by means of the suitable source of supply shown as a battery 32 connected in series with an output resistor 33. Connected across the output resistor 33 is an amplifier 34. The output of the amplifier is connected to a pulse height analyzer 35 of conventional design. The analyzer 35 may be of the multichannel type, such as Model ND101 as manufactured by Nuclear Data, Inc. Such an analyzer 35 may include or have connected to it an exhibiting means 36 of the indicating and/or recording type.

Referring again to FIG. 2, the dimension arrows appearing about half-way of the peak 16 show the half-way spacing Δ which may be taken as a measure of the resolution. At half-height, it is of the order of one or two percent of the energy. Such a high degree of resolution is achieved in accordance with the present invention by the use of a semiconductor as the diode 31. This diode likewise provides high sensitivity by reason of the large volume of the sensitive or depletion region 31a.

It will be observed from FIG. 1 that the depletion region 31a, while relatively large in physical cross section, is disposed between the P-type of material 31P and the N-type of material 31N. The materials 31P and 31N preferably have volumes which are each small (preferably one-half or less) relative to the volume of the sensitive regions 31a. Further in accordance with the invention, the material of predominant importance in the diode 31 has a relatively high atomic number (83 for bismuth). Since bismuth is a high-Z material, the principal response from the gamma ray spectrometer will be due to photoelectric phenomenon and pair production phenomenon, and the response due to Compton scattering will be of a minor and negligible value in terms of output. Further in accordance with the invention, the materials forming the diode 31 have a low order of neutron sensitivity in terms of output, particularly in respect to the likelihood of interaction with slow as well as thermal neutrons. The relative neutron sensitivity of a material may be approximated by the capture cross section of each of those constituent elements for thermal neutrons. For bismuth, that cross section in barns is 0.034, and for tellurium, 4.7.

From the foregoing, it will be seen that the relative neutron sensitivity of the diode 31 of bismuth telluride will be primarily due to the capture in tellurium. A gamma ray spectrometer, according to the present invention, combines all of the foregoing features of good resolution, high sensitivity to gamma radiation and low sensitivity to slow and thermal neutrons. Moreover, the spectrometer 30, of small size, is adapted to the logging or exploration of wellbores. The use of the spectrometer for logging will later be described.

Bismuth telluride, bismuth sulfide, and bismuth selenide are preferred compounds for the diode 31 by reason of the fact that the principal component by weight of each material is bismuth. Of all the elements, bismuth is the highest-Z element which is stable. All other elements with an atomic number greater than bismuth are radioactive and hence are unsuitable for use in a radiation detector. Bismuth telluride, bismuth sulfide, and bismuth selenide also have relatively low neutron-capture cross sections expressed in barns. In this connection, the cross section of bismuth sulfide is considerably less than that of bismuth telluride because of the low capture cross section of 0.52 barn in sulfur. Accordingly, bismuth sulfide has a much lower neutron sensitivity than bismuth telluride.

Bismuth selenide has a higher capture cross section since selenium has a cross section of 12.3 barns; however, it may be used for the diode since its neutron sensitivity, though not of the lowest order, is still low enough to qualify as a useful material for the diode forming part of gamma ray spectrometer of the present invention.

A semiconductor diode made from tellurium has a relatively high atomic number and a low neutron-capture cross section. When a pure gamma ray source is utilized instead of a mixed source which includes both gamma radiation and neutrons, then a diode made of a material such as cadmium telluride may be utilized even though cadmium has a neutron-capture cross section of 2400 barns.

It is to be noted that bismuth telluride, bismuth sulfide, bismuth selenide, tellurium, and cadmium telluride all include elements having atomic numbers greater than 50 and a neutron-capture cross section less than 15 barns and that elements with such limits are preferred for the diode.

For best performance, both as regards energy resolution and depth of the depleted zone, the diode preferably should be operated at reduced temperatures. Although the diode may meet some operational requirements when operating at room temperatures (nominally 65° F. to 85° F.), the preferred operating range of temperatures for the optimum performance will be obtained by cooling to the temperature of solid carbon dioxide (−78° C.) or liquefied nitrogen (−195° C.). Such low-temperature operation of a measuring instrument is not particularly unusual, and those skilled in the art will understand how to provide the structure for such low-temperature operation in the logging of wellbores as hereinafter described.

The techniques of making diodes both by the crystal pulling method and the diffused junction processes are now well understood and are described in the book, "Solid State Physics," by Seitz and Turnbull (1959) and are further described in the periodical references referred to therein.

For the diode 31 of FIG. 1, there will be provided an excess of one material to provide the P-component of region 31P, and there will be provided an excess of another material to provide the N-component for the region 31N of the diode 31. In the sensitive or depletion region 31a, of relatively large volume, the materials of the compound will be present in proportions approximating their stoichiometric values.

By utilizing materials of high atomic number and including the other properties discussed above, the gamma ray spectrometer will provide an output proportional to the received quantum energy of the gamma ray spectrum. Thus, the high-Z material provides stopping power adequate to assure in their pair production phenomenon, conversion of the gamma rays to useful electrical outputs. Gamma rays having energies as high as 9 mev. will be detected. As already explained, response to neutrons will be of a very low order and insufficient adversely to affect the operation of the spectrometer 30. The detector or diode 31 will provide that high degree of resolution which will produce on the exhibiting means 36 of FIG. 1 reproduction of the pulses 16 of FIG. 2 with sufficient resolution so that there is no overlapping with neighboring gamma rays. The detection of pulses 16 will clearly indicate the presence of chlorine in gamma ray spectra including that of iron. While a single-channel analyzer may be utilized and operated successfully to scan the several lines of the gamma ray spectra as shown in FIG. 2, obviously the multiple-channel analyzer 35 will for most applications be preferred. The sensitivity and resolution of the gamma ray spectrometer, in accordance with the present invention and as indicated by detection of pulses 16 in FIG. 2, is to be contrasted with the response of other prior art detectors and as indicated by the output curve 38 of FIG. 3 which gives the pulse size spectrum from monoenergetic gamma rays with a quantum energy of 6.64 mev. from a sodium iodide scintillator. When the resolution is of such a low order, no definite conclusions may be drawn as to the presence of one or more materials giving rise to an output such as illustrated by the curve 38. It is to be understood that in the operation of the spectrometer 30 of FIG. 1, the back-bias applied by the battery 32 will be relatively high and will be adjusted for given applications for optimum performance and as well understood by those skilled in the art in the operation of diodes.

Figure 4:
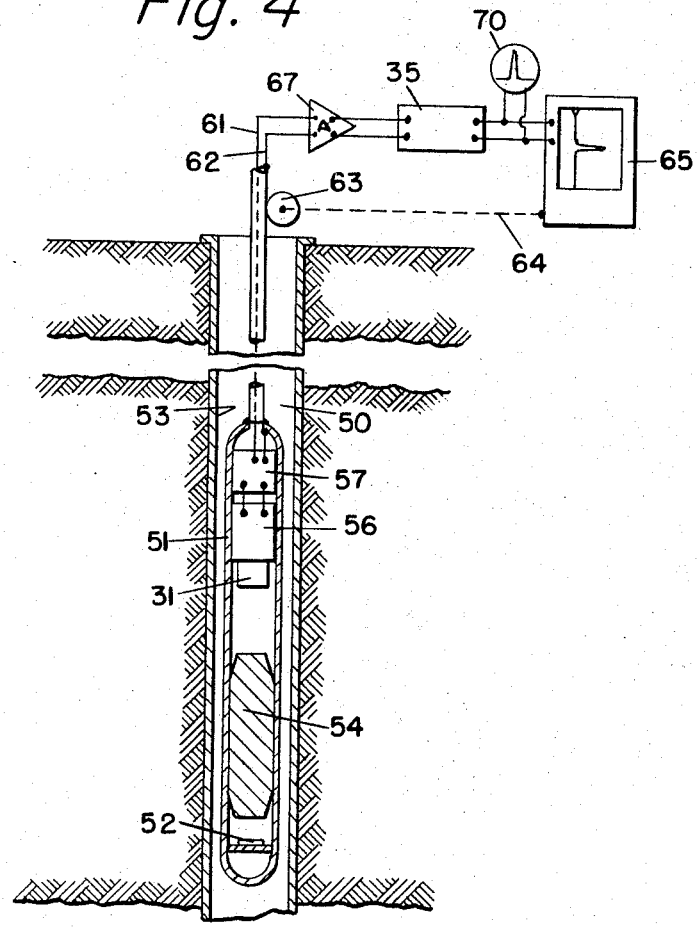
FIG. 4 illustrates a logging instrument embodying the gamma ray spectrometer of the present invention.

As indicated above, the gamma ray spectrometer 30 of FIG. 1 is particularly useful in the logging of wellbores as indicated at 50 in FIG. 4. The logging instrument is enclosed within a housing 51 having a source 52 of neutrons for irradiating the adjacent formations. The housing 51, it will be observed, is illustrated in a wellbore having an iron casing 53. Such iron casings are utilized in wells particularly when they are of the producing type, either for oil or gas. By reason of the presence of the iron casing 53, there is produced, by the neutrons bombarding the iron, the iron spectrum illustrated by the broken lines in FIG. 2. The neutrons pass through the iron casing and into the formations, and if salt water be present, the chlorine component gives rise to the generation of the chlorine spectrum shown by the solid lines of FIG. 2. The detector comprising the diode 31 is disposed in the instrument housing 51 in a position above a shielding mass 54 of lead which is of volume adequate to prevent bombardment of the detecting diode 31 with high energy gamma rays from the source 52. The battery 32 and resistor 33 of FIG. 1, together with the amplifier or preamplifier 34, will be located in the compartments 56 and 57. The output from the amplifier will be applied to cable conductors 61 and 62 which form a part of the suspension means for the instrument housing 51. A depth indicator comprising a pulley or sheave 63 is arranged through the mechanical connection 64 to drive the chart of a recorder 65. The conductors 61 and 62 apply the output from the down-hole amplifier to an up-hole amplifier 67, the output of which is applied to the analyzer 35. The output of the analyzer 35 is utilized to drive the pen of the recorder, and it may also be applied to an oscilloscope 70 for visual display of selected or a multiplicity of lines of the gamma ray spectra.

It is to be understood that the instrument housing 51 will normally be lowered in the wellbore 50 at constant speed for continuous logging of the cased wellbore. However, in other applications a more detailed analysis can be made with the instrument located at a fixed position next to a particular formation of interest. As is well known in the art, a spectral analysis may be made of the material in the formation under such circumstances. Logs can be obtained for both directions of travel, and the resultant gamma ray spectra, particularly distinctive lines thereof, will be recorded in correlation with the depth of the wellbore. The source 52 may be of any of the well-known types, such for example, as a plutonium-beryllium mixture, or a combination of polonium and beryllium. Both of these sources emit gamma rays with a quantum energy of 4.43 mev., which gamma rays are nevertheless shielded from the detector 31 by the large lead mass 54. As already explained, the detector 31 responds selectively to the gamma rays generated by the neutron bombardment of the adjacent materials including the iron casing 53 and the materials surrounding that casing.

What is claimed is:

A well logging system for logging gamma rays in a borehole, comprising:
  an instrument housing and means for moving said housing through said borehole,
  a logging instrument disposed within said housing, said instrument including a source of neutrons for irradiating the adjacent formations, and a detector having a high sensitivity to gamma rays and a low sensitively to thermal neutrons for producing an output of electrical pulses having heights related to the energy of the gamma rays detected, including:
    a diode constructed of semiconductor material including at least one element having an atomic number of at least 50 and including elements each having a thermal neutron-capture cross-section less than 15 barns, said diode having a sensitive depletion region disposed between the P-type and N-type regions, the volume of said depletion region being more than twice the volumes of said P-type and said N-type regions so that annihilation quanta are fully converted in the depletion region to electrons,
    a source of voltage, and
    connections to said P-type and said N-type regions from said source of voltage for back-biasing the diode,
said system further comprising:
  a pulse height analyzer for passing pulses having heights falling within a selected energy range, the output of said detector being connected to said pulse height analyzer, and
  a recorder for recording the output of said pulse height analyzer as a function of depth of said instrument housing in said borehole.

References Cited by the Examiner

UNITED STATES PATENTS

| | | | |
|---|---|---|---|
| 2,745,973 | 5/1956 | Rappaport | 250—83.3 |
| 2,747,104 | 5/1956 | Jacobs | 250—83.3 |
| 2,760,078 | 8/1956 | Youmans | 250—83.3 |
| 2,786,166 | 3/1957 | Paganski | 317—235 |
| 2,885,562 | 5/1959 | Mariance | 250—83.3 |
| 2,893,831 | 7/1959 | Bither | 317—241 |
| 2,952,817 | 9/1960 | Kennedy | 250—83.3 |
| 2,988,639 | 6/1961 | Welker | 250—83.3 |
| 3,126,483 | 3/1964 | Hoolst | 250—83.3 |

OTHER REFERENCES

Photovoltaic Gammas-Ray Dosimeter, by Moody et al., Nucleonics, vol. 16, No. 10, October 1958, pp. 101–103.

RALPH G. NILSON, *Primary Examiner.*

ARTHUR GAUSS, *Examiner.*

J. W. LAWRENCE, S. ELBAUM, *Assistant Examiners.*